United States Patent
Basham

[19]

[11] Patent Number: 6,164,615
[45] Date of Patent: Dec. 26, 2000

[54] CORROSION RESISTANT MACHINE FOUNDATION

[76] Inventor: L. Robert Basham, 1416 Crescent Dr., Kingsport, Tenn. 37664

[21] Appl. No.: 09/336,935

[22] Filed: Jun. 21, 1999

[51] Int. Cl.[7] ............................. F16M 1/00; F16M 11/00; F16M 3/00; F16M 5/00; F16M 7/00
[52] U.S. Cl. .................... 248/678; 248/679; 248/346.01; 248/357; 248/637; 52/294
[58] Field of Search ....................... 248/678, 679, 248/346.01, 357, 637; 52/294; 249/51, 48, 49

[56] References Cited

U.S. PATENT DOCUMENTS

| | | | |
|---|---|---|---|
| 1,183,169 | 5/1916 | Crist | 249/49 X |
| 1,948,931 | 2/1934 | Mears | 249/49 X |
| 3,570,801 | 3/1971 | Moritz | 249/49 X |
| 5,419,529 | 5/1995 | Welch et al. | 249/134 X |

*Primary Examiner*—Leslie A. Braun
*Assistant Examiner*—A. Joseph Wujciak
*Attorney, Agent, or Firm*—Malcolm G. Dunn

[57] ABSTRACT

A corrosion resistant machine foundation formed from precast corrosion resistant vertical panels of an aggregate filled thermosetting resin defining an enclosed hollow form, each of the two side edge portions of each vertical panel intersecting one of the two side edge portions of an adjacent vertical panel at a predetermined angle and forming therewith a corner of the enclosed hollow form; the hollow form defining at each of the corners a barrier extending across and spaced from the corner from one vertical panel to an adjacent vertical panel and from the bottom of the hollow form to a predetermined height less than the height of the two adjacent vertical panels to form a vertically extending chamber; a portion of the bottom of the vertically extending chambers and the hollow form being filled with a cementitious material within the area of the hollow form between all of the vertical panels and each of the barriers to the top of each barrier, and each of the vertically extending chambers and the remaining area within the hollow form above the predetermined height of the barriers being filled to the top of all of the vertical panels with a grout of corrosion resistant material to define an essentially flat corrosion resistant horizontal surface to which a machine may be attached.

14 Claims, 8 Drawing Sheets

CORROSION RESISTANT MACHINE FOUNDATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICRCFICHE

Not Applicable

BACKGROUND OF THE INVENTION

The present invention is directed to a corrosion resistant foundation for use in preparing a machine foundation, such as a foundation for a pump or the like, or for repairing an existing machine foundation.

Machines, such as pumps and other types of equipment, are usually bolted to concrete foundations so as to secure the pump or equipment in place. Concrete foundations may be coated with a comparatively thin (about ⅛ inch to about ¼ inch) corrosion resistant polymer coating, which is relatively fragile and difficult, costly and time consuming to install. The concrete in the foundation, over time, may be attacked by the materials handled by the machine if the media involved is an aggressive chemical, such as by the liquids being pumped, or by the oils or greases that are used to lubricate the machines. Such attacks destroy the structural integrity of the machine foundation, and the loss of structural integrity allows the machine to vibrate, serving to further the destruction of the foundation and premature failure of the machine and or machine components. Still further, the machine foundations may also be subject to attack by chemicals from other nearby machines as those liquids may accumulate on the concrete floor to which the machine foundations are bonded or on which such foundations are situated. Concrete has limited chemical resistance and is subject to attack by a variety of chemicals. For instance, acids which react with the cement in the concrete and cause a breakdown of the integrity of the material.

An object of the invention is either to replace the concrete foundation with a corrosion resistant foundation, which is non-reactive, or to repair the remaining concrete portion of the foundation in such manner that only the corrosion resistant material will be exposed to such liquids, water, lubricating materials and the like, with the cementitious material involved in the construction of the foundation being encased within the corrosion resistant material.

By the use of the term "cementitious," it is meant generally the use of minerals that react with water and bond together to produce a hardened material that has rock-like properties. Portland type cements, for example, may be used to provide the aforementioned "minerals." These materials are also generally less expensive than corrosion resistant materials, and since the cementitious materials will not be exposed to corrosive influences, due to the manner in which the corrosion resistant machine foundation of the invention is constructed, there would be little purpose served in using more expensive materials to construct the bulk of the foundation. Also, the advantage of using cementitious materials enables repairs to be made in areas where water already exists, with that water participating in the curing or installation. This is not to say, however, that no other materials may be used, if one wanted to use same.

Other examples of cementitious materials suitable for use in the disclosed invention may be Speed Crete® 2028, as produced by Tamms Industries of Kirkland, Ill. This product is a proprietary formulation of blended Portland cements, finely processed selected aggregates, and specific chemical additives, is cement based, is rapid setting, and it achieves compressive strength of about 3600 psi (pounds per square inch) within one hour at 75 degrees Fahrenheit. Another suitable material is Five Star Structural Concrete®, as produced by Five Star Products, Inc. of Fairfield, Conn. This material develops a bond strength of about 2000 psi (pounds per square inch) in about one day; provides optimum dimensional stability, meaning that the material will not pull away from the existing concrete; and it forms an integral bond to existing concrete.

The aforementioned corrosion resistant material will also not react with the fluids or liquids being handled by the machine, or by any lubricating materials used in connection with the machine. Such corrosion resistant material further will not be absorbent to such liquids or lubricants or greases. The corrosion resistant material making up the exposed surfaces of the machine will enable personnel to easily clean and maintain the foundation. Any leakage of corrosive materials being pumped, or if caustic or otherwise aggressive cleaning materials are used, these will also generally not be destructive of the integrity of the machine foundation. The end result of the use of corrosion resistant material will mean that the machine foundation will have a significantly longer life than a machine foundation, for example, constructed solely of cementitious materials or a coated-in-place foundation.

A further advantage to use of a corrosion resistant material for a machine foundation is that in an industrial setup, which is usually the case with such machine foundations, any breakdown of the integrity of a machine foundation, means lost production time until that foundation can be repaired or replaced and the pump or machine placed back into operation.

Such breakdown of the foundation, can also cause damage to seals in a pump, for instance, where the length and weight of the pump are such that the pump is no longer being supported on a level surface and thus being more susceptible to vibration.

A further object of the invention is to employ cementitious materials for the bulk of the machine foundation in such manner that it will not be exposed to liquids, lubricating materials, and the like, as previously mentioned, while the corrosion resistant material, which is generally much more expensive, will be employed on the exterior surfaces of the machine foundation. Further, the corrosion resistant material will be applied to such extent and in such thicknesses that any vibrations caused by the machine or any exterior abuse such as by impact from dropped tools, forklifts and the like will not cause any breakdown of the corrosion resistant materials.

Examples of suitable corrosion resistant materials that may be used in the construction of the corrosion resistant machine foundation of this invention include, for instance, Blome Number 35, a two component, silica filled resin bonded polymer concrete, produced by Blome Cements Company of O'Fallon, Mo. This material has resistance to a broad range of chemicals including most non-oxidizing acids and alkalis, solvents, water and weather. At 75 degrees Fahrenheit, this material will cure solid in about ten to about twelve hours. Another suitable Blome material that may be used is Blome Number 85, a non-shrink epoxy polymer grout having good resistance to a wide range of chemicals, oils and solvents. Still another Blome material: Blome Number 95, a three component, silica filled novalac epoxy polymer concrete, which exhibits excellent resistance to 98% sulfuric acid, concentrated hydrochloric acid and 50% sodium hydroxide. A further Blome material: Blome Number VE300, a three component, silica filled vinyl ester resin polymer grout, which is suitable for certain high temperature applications; strong oxidizing acids, such as nitric and chromic; and acid bleach or acid solvent solutions.

The use of corrosion resistant materials for the construction or repair of a machine foundation is known in the art. For instance, the Welch et al patents, U.S. Pat. No. 5,165,651 (1992) and U.S. Pat. No. 5,437,430 (1995), disclose a machine foundation and methods for preparing or repairing a machine foundation, which includes the use of aggregate filled thermosetting resin or a thermoplastic resin, which are corrosion and chemical resistant materials free from fluid attack. Welch et al indicate that the preferred form of the invention is a hollow form that has vertical walls and a single top horizontal wall, which has openings in the top through which fortifying materials such as epoxy based polymer concretes can be poured to fill the form. The hollow form used for such construction cannot be formed on the work site, but rather has to be manufactured. This means, of course, that measurements must be made at the work site of the damaged foundation that requires repair or a measurement made of the equipment to be supported by a foundation, and then this information is communicated to the manufacturing plant where the hollow form is then custom made to order. This takes time, and it means that the machine or equipment that is to be supported by the hollow form is shutdown and is, therefore, non-productive. An object of the present invention is to employ precast vertical panels made of an aggregate filled thermosetting resin that may be cut to size at the work site, the construction or repair taking place on the work site immediately, and restoration of the operation of the pump or machine taking place in about two to three days from the time measurements are taken. The use of precast vertical panels are easier and less expensive to manufacture. Such use also saves the costs of labor and materials involved in the old method of constructing wood or plywood forms that must be removed after a foundation has been poured and cured. The precast vertical panels of the invention, therefore, not only serve as a form for the foundation, but also remain permanently in place as part of the foundation. Further, the horizontal surface of the machine foundation of the present invention is formed as part of the pour of the corrosion resistant material.

The material used in forming vertically extending panels of aggregate filled thermosetting resin may be the same material employed in forming the pour of corrosion resistant materials, as referred to herein. For instance, the material employed includes selected aggregates bonded together with a thermoset plastic binder. These liquid thermoset resins require suitable curing agents to convert them from their liquid form into a fully cross-linked plastic, which then bonds completely with the aggregate. Typically, silica and quartz are the best fillers for use in polymer concrete or grout. The size of the aggregate also has an impact on the physical properties, and, in turn, the overall quality of the resulting polymer concrete. This latter aspect, however, is within the skill of the art and is well-known.

The use by Welch et al of thermoplastic resin in panels requires skill in welding the panels together. Usually, welding of thermoplastic panels also has to take place at the manufacturing plant because often personnel skilled in such welding and the equipment employed for such are not usually available at the work site. The invention disclosed herein, as previously mentioned, uses precast aggregate filled thermosetting panels, which may be cut to size at the work site.

In the FIG. 5 embodiment of each Welch et al patent, the hollow form is made from two forms, each form having a side vertical wall and an end vertical wall made of either an aggregate filled thermosetting resin or a thermoplastic resin, joined together to surround an existing degraded machine foundation. Each form has two tubular members formed on its end wall through which pins are inserted to hold the two forms together. Then a sealing material, such as an epoxy resin or other suitable adhesive for the aggregate filled thermosetting resin or the thermoplastic resin is applied along the connecting edges of the end walls of the forms where the forms are joined by the pins inserted through the tubular members. Although it is indicated that this embodiment may be constructed in the field, the forms and their tubular members still have to be made to the appropriate size at the manufacturing plant. After the two forms are connected together around the foundation to be repaired and appropriately sealed, the hollow form is filled with a fortifying material, such as a polymer concrete that is fast setting with very little shrinkage upon setting, substantially to the top of the form. The fortifying material is allowed to set, and thereafter the hollow form is filled with a layer of the same material used in making the two forms.

In the present invention, and as previously mentioned, the bulk of the machine foundation is comprised of a less expensive cementitious material than the corrosion resistant material. Also, to ensure that the joints where the intersections of the edges of the different panels come together to form the hollow form, a barrier is Formed interiorly of the hollow form across the resulting corners to create vertically extending channels. The resulting area or channel within each of the barriers is then filled with corrosion resistant material, which bonds well to the interior corners formed by the intersecting panels, and provides not only well-sealed interior corners, wherever a panel has intersected with an adjacent panel, but also provides a strong reinforced corner. The end result of this construction is to produce in a relatively short period of time an effective but less expensive machine foundation, which is not only resistant to any corrosion effect, but it is also resistant against any vibrations of the pump or equipment installed on the machine foundation.

BRIEF SUMMARY OF THE INVENTION

The present invention, therefore, is directed to a corrosion resistant foundation having precast vertical panels of an aggregate filled thermosetting resin defining an enclosed hollow form, each of the two side edge portions of each vertical panel intersecting one of the two side edge portions of an adjacent vertical panel at a predetermined angle and forming therewith a corner of the enclosed hollow form. At each of the corners there is defined a barrier extending across and spaced from the corner from one vertical panel to an adjacent vertical panel and from the bottom of the hollow form to a predetermined height that is less than the height of the two adjacent vertical panels to form a vertically extending channel. A portion of the bottom of the vertically extending chambers and the hollow form are filled with a cementitious material in the area of the hollow form between all of the vertical panels and each of the barriers to the top of each of the barriers. Each of the vertically extending channels and the remaining area within the hollow form above the predetermined height of the barriers being filled to the top of all of the vertical panels with a grout of corrosion resistant material to define an essentially flat corrosion resistant horizontal surface for the corrosion resistant machine foundation to which a machine may be attached.

The corrosion resistant machine foundation is positioned on a concrete floor to which the cementitious material within the hollow form bond the corrosion resistant machine foundation and the concrete floor together.

The bottom end portion of the corrosion resistant machine foundation may preferably be positioned within a recess formed in the concrete floor and is spaced slightly from the bottom of the recess, and the cementitious material that is filled within the hollow form also fills the recess within and around the bottom end portion of the corrosion resistant machine foundation to bond the bottom end portion to the concrete floor.

The corrosion resistant machine foundation may include vertically extending support rods, which are secured to the concrete floor or may preferably be secured to the bottom of the recess formed within the concrete floor, and which extend through the cementitious material within the hollow form and also through the grout of corrosion resistant material of the horizontal surface of the hollow form for connection to the machine.

The corrosion resistant machine foundation may include reinforcement rods, which extend vertically upwardly from the concrete floor or from the bottom of the recess formed in the concrete floor and into the area of the hollow form that is filled with cementitious material, the reinforcement rods being surrounded and embedded by the cementitious material.

The present invention is also directed to a corrosion resistant machine foundation having precast vertical panels of an aggregate filled thermosetting resin defining an enclosed hollow form, each of the two side edge portions of a vertical panel intersecting one of the two side edge portions of an adjacent vertical panel at a predetermined angle and forming therewith a corner of the enclosed hollow form. The corrosion resistant foundation has a grout of corrosion resistant material: a) within a first area extending across and spaced from each corner from one vertical panel to an adjacent vertical panel and from the bottom of the machine foundation to a predetermined height that is less than the height of the two adjacent vertical panels; and b) within a second area extending from the aforementioned predetermined height and across the width and length of the machine foundation to the top of the vertical panels to define an essentially flat horizontal surface to which a machine may be attached. The machine foundation then has cementitious material within a third area extending between the aforementioned first area and the second area.

The corrosion resistant machine foundation of the preceding paragraph is positioned on a concrete floor to which the cementitious material within the aforementioned third area bonds the corrosion resistant machine foundation and the concrete floor together.

In this latter corrosion resistant machine foundation, vertically extending support rods for the machine may be secured to the concrete floor or to the bottom of the recess formed in the concrete floor and extend through the cementitious material within the third area and also through the grout of corrosion resistant material of the second area for connection to the machine.

Also in this latter corrosion resistant machine foundation, reinforcement rods may extend vertically upwardly from the concrete floor or from the bottom of the recess formed in the concrete floor and into the aforementioned third area and be surrounded and embedded by the cementitious material.

DETAILED DESCRIPTION OF THE INVENTION

Figure 1:
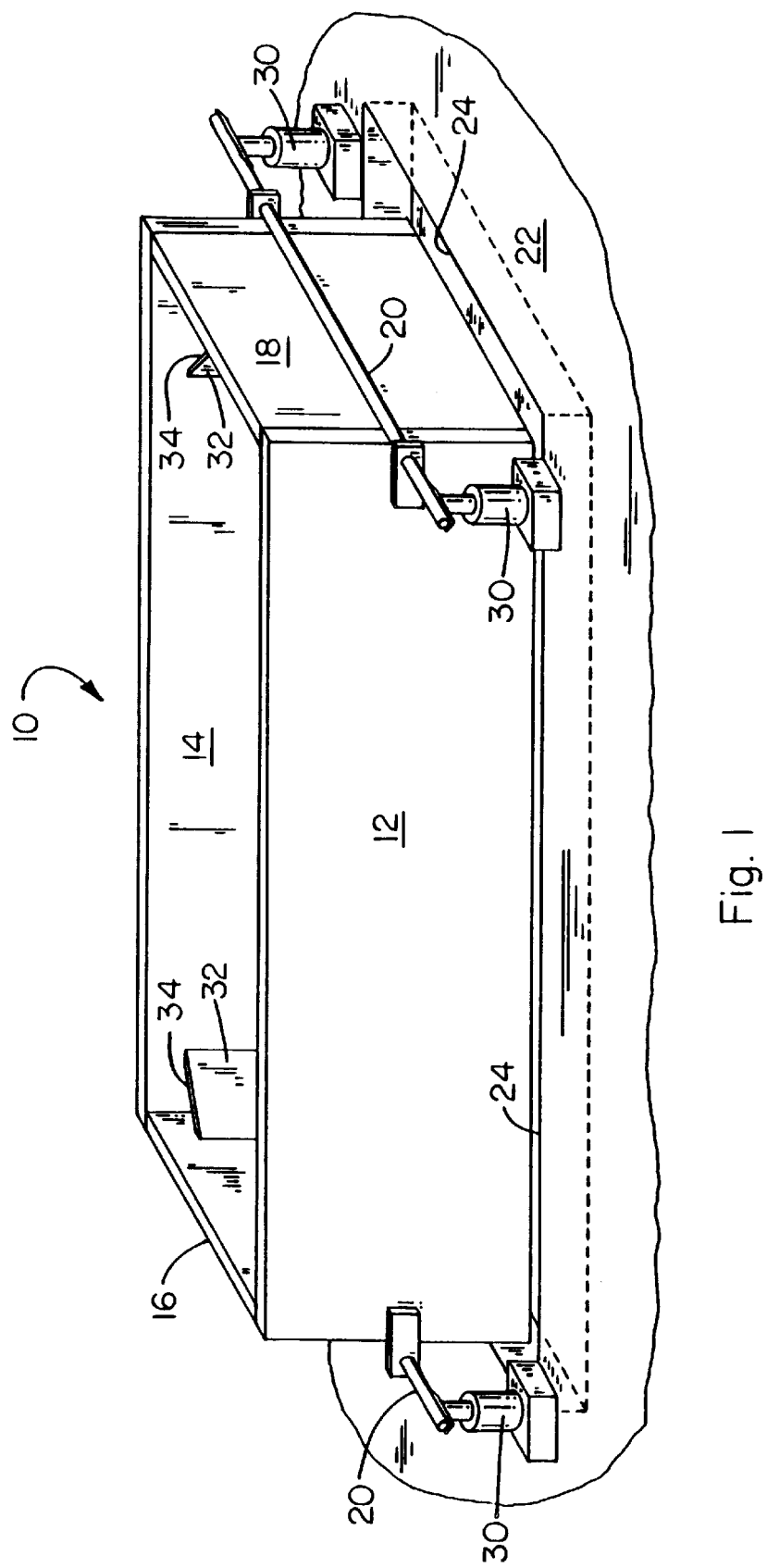
FIG. 1 is an isometric view of the hollow form for the corrosion resistant machine foundation of the invention showing the bottom edge portion of the hollow form positioned within and spaced from the bottom of a recess formed in a concrete floor and illustrating the bar clamps for holding together the individual vertical panels making up the hollow form and the floor jacks for supporting the bar clamps and serving to elevate the clamped hollow from the bottom of the recess and level it.
Figure 2:
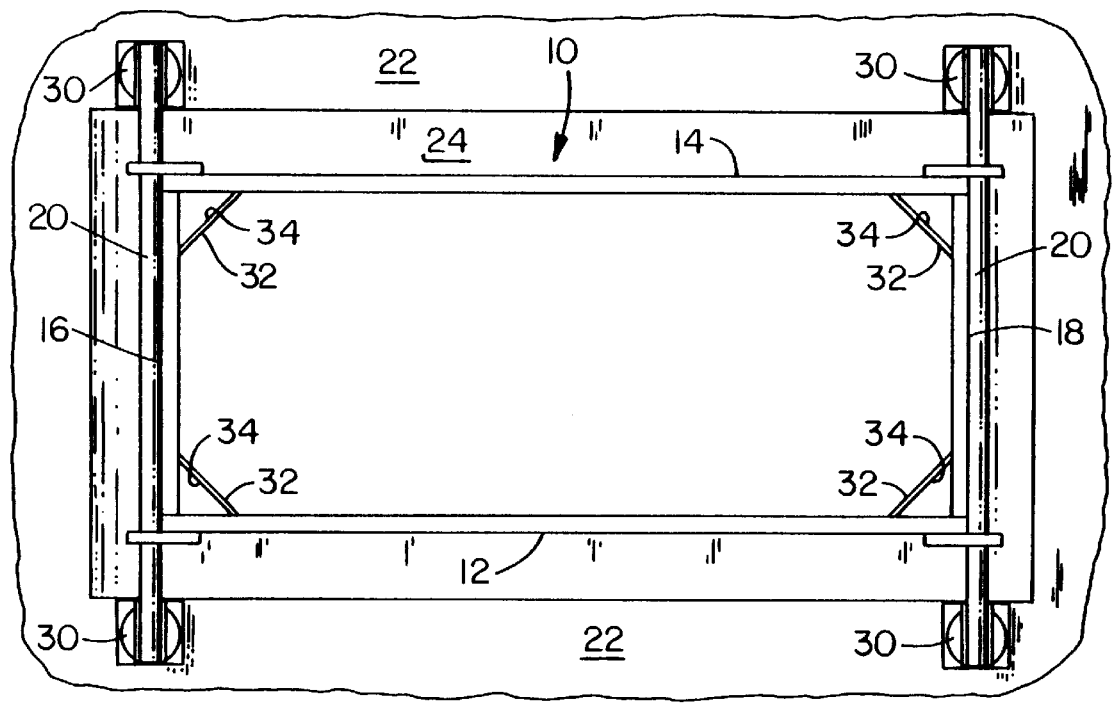
FIG. 2 is a plan view of the hollow form shown in FIG. 1 and also illustrating the barriers that are formed across the interior corners of the hollow form.

In reference to the drawings, FIGS. 1 and 2 show the formation of a hollow form 10, which is comprised of precast, aggregate filled thermosetting vertical panels, 12, 14, 16, and 18, which may be cut to size at the work site or cut to size or molded at the manufacturing plant beforehand, and then assembled together at the job site and temporarily held in place, as for example, by bar clamps 20. The hollow form, as clamped together, may be positioned around the foundation of a previously existing machine foundation that may have become degraded, or serve as a beginning of a new machine foundation.

The concrete floor 22, where the machine foundation is to be located, is preferably prepared beforehand by forming or cutting a recess 24 in the concrete floor to a depth of at least one and one-half inches, or preferably three to four inches, below the floor level, and also being extended beyond and around the actual area that will be occupied by the hollow form 10.

Figure 3:
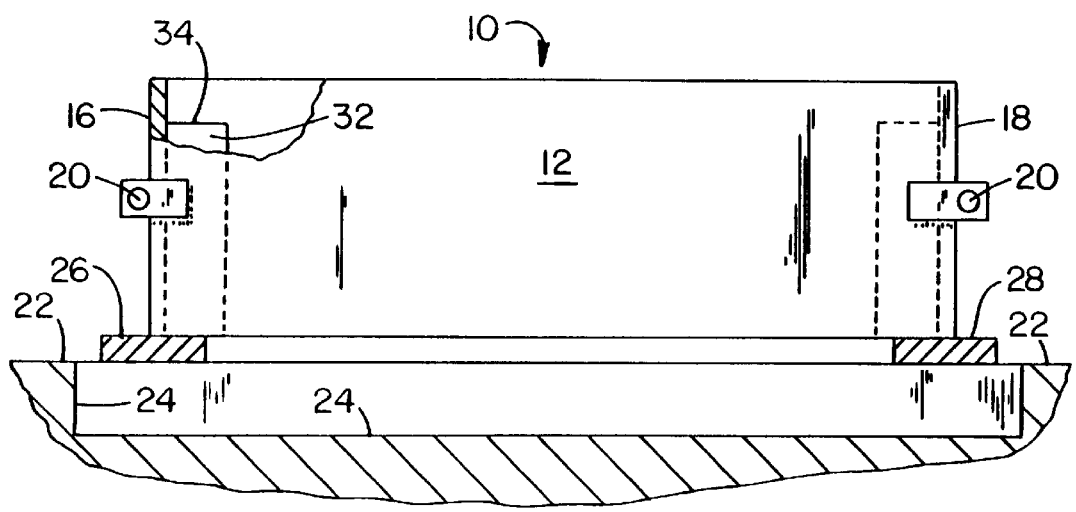
FIG. 3 is a front elevational view of the hollow form used initially to construct the corrosion resistant machine foundation shown in FIG. 1, and illustrates how the hollow form may initially be positioned upon a pair of boards to ensure the squareness of the individual vertical panels making up the hollow form with respect to each other before they are clamped together and with the boards spanning the width of the recess formed in the concrete floor, and also illustrating the bar clamps for holding together the vertical panels.
Figure 4:
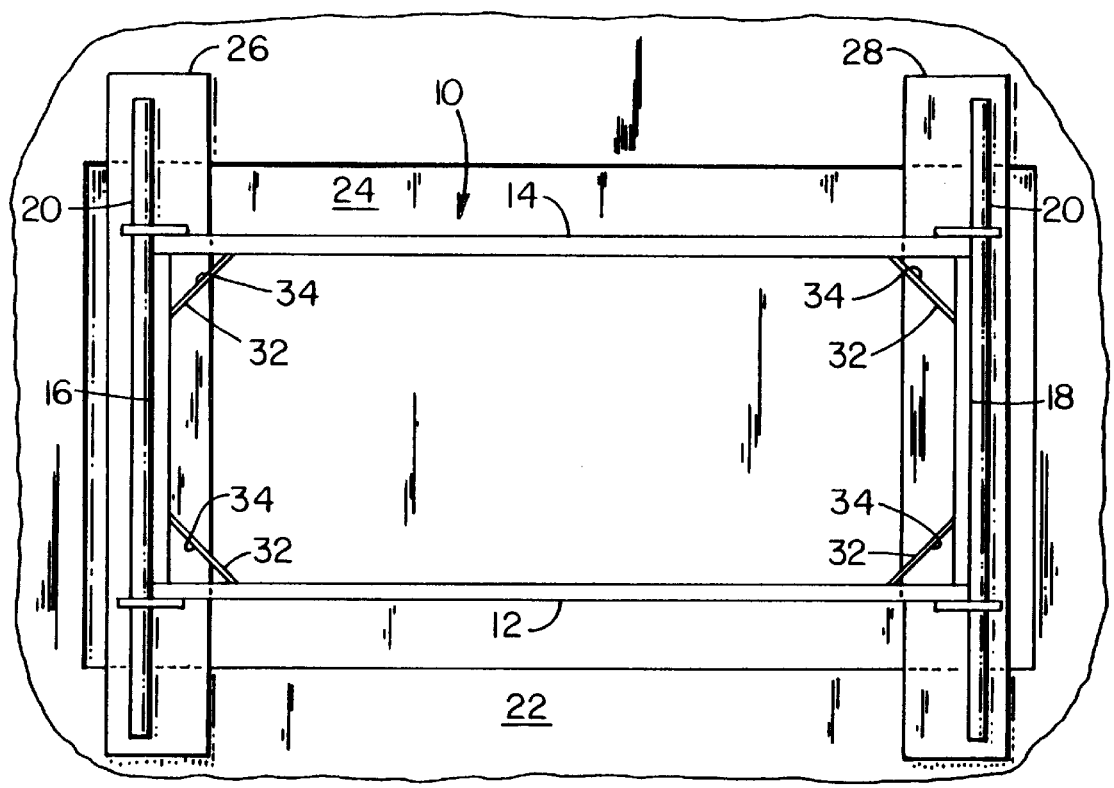
FIG. 4 is a plan view of the hollow form, the pair of boards and bar clamps shown in FIG. 3.

To ensure that the four vertical panels 12, 14, 16, and 18 are square with respect to each other before they are clamped together by the bar clamps 20, a pair of boards 26, 28, as shown in FIGS. 3 and 4, may be positioned in spaced apart relationship across the recess 24 formed in the concrete floor 22, in the manner illustrated. The vertical panels are then positioned upon the pair of boards, and abutted together in such manner that each corner where two adjacent vertical panels are abutted is at a right angle, and then the vertical panels are clamped together in that position by the aforementioned bar clamps 20.

The hollow form 10, as clamped together, may next be lifted from the boards 26, 28 so that the boards may be removed, and then the hollow form is lowered into position within the recess 24 formed in the concrete floor 22, as shown in FIG. 1.

The bar clamps 20 are of sufficient length so as to extend beyond the ends of the hollow form 10, and then each end of each of the bar clamps is positioned on a separate floor jack 30, which serves to elevate the hollow form from resting directly upon the bottom of the recess and to level the top of the hollow form. The clamped hollow form is adjusted to the proper elevation by means of the floor jacks on which the bar clamps 20 are supported, until a space, for example, of about one-half inch is reached between the bottom edge portion of the hollow form and the bottom of the recess 24, as shown in FIG. 1.

In the manner, as described thus far, the vertical panels 12, 14, 16, and 18 will then serve as forms that will remain permanently in place as part of the machine foundation of the invention.

A barrier 32 is formed across each interior corner of the hollow form 10 where one side edge portion of one vertical panel intersects with the side edge portion of an adjacent vertical panel. The barrier 32 may itself be a rigid panel formed from sheet metal, thin plywood or other suitable material, and then the barrier may be attached to the inside corner of the hollow form, as by use of any suitable adhesive or tape, which tape or adhesive also serves to seal the vertical seam between the barrier and the vertical panels. In this manner, the attached barrier 32 extends from one vertical panel to an adjacent vertical panel; and it also extends vertically upwardly from the bottom of the hollow form to a predetermined height of the hollow form that is less than the height of the two adjacent vertical panels. The "predetermined height" may, for instance, terminate from about one inch to about two inches below the top edge portion of the hollow form. Each barrier forms between the barrier and the interior corner of the hollow form a vertically extending channel 34.

Figure 5:
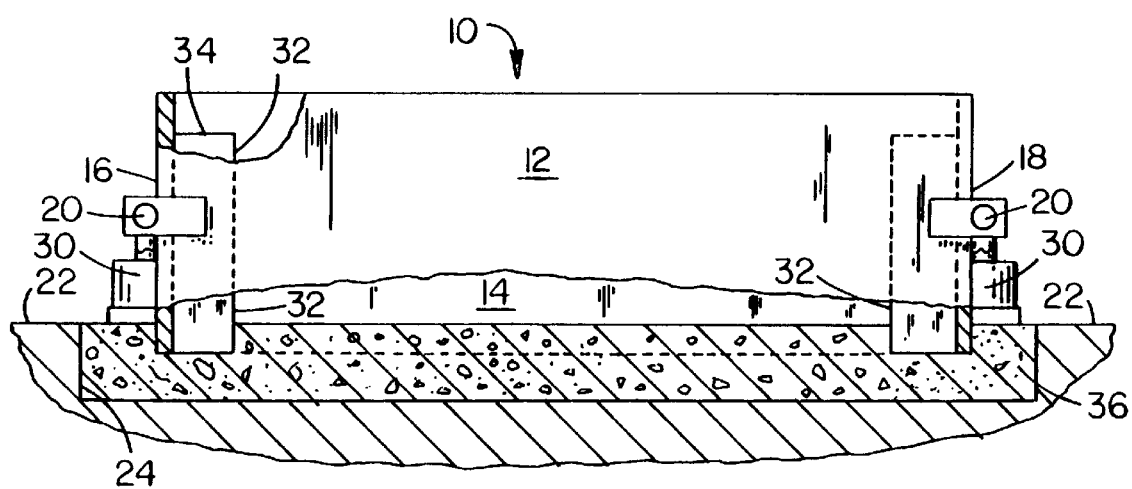
FIG. 5 is a front elevational view of the hollow form shown in FIG. 1, partly broken away and in cross-section, to illustrate the internal appearance of the hollow form following the initial pour of quick setting cementitious material, which has flowed around and out from under the bottom edge portion of the hollow form also to fill up the recess in the surrounding concrete floor and also to lock in the bottom edge portion of the hollow form with respect to the concrete floor.

The hollow form 10 is next partially filled with a quick setting cementitious material 36, as shown in FIG. 5. The cementitious material flows under the barrier 32 to fill a portion of the bottom of the vertically extending channel 34 and also flows out from under the bottom edge portion of the hollow form so as not only to flow around both sides of the bottom edge portion of the hollow form but also to fill up the recess 24 that was formed in the concrete floor 22.

The cementitious material is then allowed to take an initial set, which may take from about fifteen (15) minutes until about one (1) hour. This first pour serves in effect as a plug for plugging the bottom of the vertically extending channels 34, and upon initial hardening will prevent later pours into the hollow form from flowing out at the bottom of the hollow form. Also, the bottom edge portions of the hollow form and of the barriers will become locked together in place in the concrete floor by the hardening cementitious material.

Figure 6:
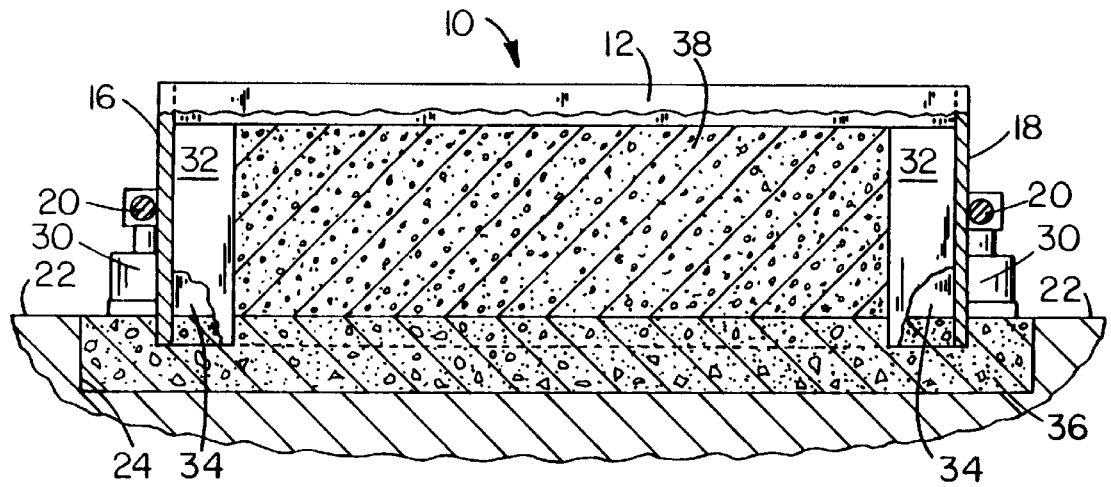
FIG. 6 is a front elevational view of the hollow form shown in FIG. 5, partly broken away and in cross-section, and illustrates the internal appearance of the hollow form following the second pour of the quick setting cementitious material.

Next, a similar cementitious material 38 is poured into the hollow form until the hollow form is filled to the top of each of the barriers 32, as shown in FIG. 6. The latter pour is then allowed to fully hydrate or harden, which may take from about three (3) to about twenty-four (24) hours, depending, of course, upon the characteristics of the particular cementitious material employed, and the environmental conditions, such as temperature and humidity.

Figure 7:
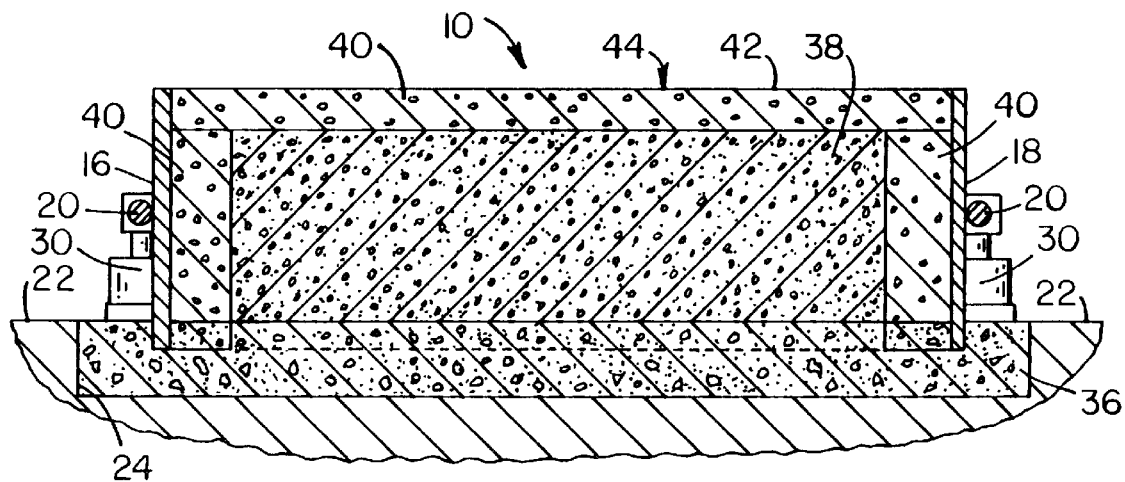
FIG. 7, is a front elevational view of the hollow form of FIG. 1 broken away and in cross-section, and illustrating the internal appearance of the completed corrosion resistant machine foundation following the pour of the corrosion resistant polymer concrete or grout within the vertical channels, as formed by a barrier at each of the internal corners of the hollow form, and that same pour also serving to fill the remainder of the hollow form to the top edge of the hollow form, thereby forming the top most horizontal surface to which a machine will be connected and completing the corrosion resistant machine foundation.

After such hydration or hardening takes place, a corrosion resistant polymer grout or polymer concrete 40, such as previously mentioned, is then poured into the hollow form on top of the hardened cementitious material and also into each of the vertically extending channels 34, until the hollow form is filled to the very top edge portion of the hollow form. This final pour results in the formation of well-sealed, well-reinforced interior corners with significant structural integrity, and produces an essentially flat corrosion resistant horizontal surface 42. This, therefore, completes the corrosion resistant machine foundation 44, as shown in FIG. 7, on which a pump, machine, or other equipment (not shown) is to be placed.

In order to prevent possible wicking of the corrosion resistant grout externally from the corners of the hollow form, i. e., at the locations of the intersections of the vertical panels, a suitable adhesive tape (not shown) may be temporarily applied exteriorly around each corner and from top to bottom of the vertical panels. In this manner, the wicking will be contained and serve to provide a better seal at the location of each intersection.

The aforementioned grout of corrosion resistant material is allowed to cure, after which the bar clamps 20 and the floor jacks 30 are removed, and then a pump, machine, or other equipment may be installed on the top of the resulting new machine foundation.

In reference to the situation where the previously existing foundation, which may have been made from Portland cement, may have become partially degraded, a pneumatic chipping hammer may be used to chip away the degraded portion of the existing foundation until the remaining portion 45 appears to be sufficiently sound and solid. Usually, the material is chipped away until any rebar or reinforcing rods (not shown) that may have been previously employed become sufficiently exposed so that the aforementioned quick setting cementitious materials 36, 38, when added later in the manner previously described, may readily bond with the rebar or reinforcing rods after the hollow form 10 has been installed in the manner disclosed around the portion of the previously existing foundation 45 that remains following the chipping process. The previously existing foundation is also chipped away sufficiently to allow room for installation of the aforementioned barriers 32.

Figure 8:
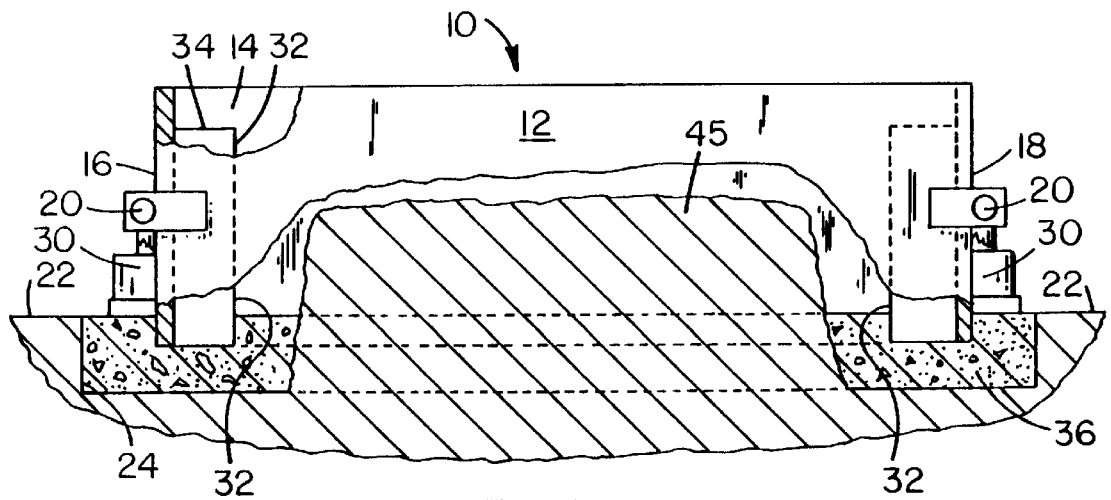
FIG. 8 is a front elevational view of the hollow form shown in FIG. 1, partly broken away and in cross-section, to illustrate the internal appearance of the hollow form as positioned around the remaining portion of a previously existing foundation after the degraded portion has been chipped away, and following the initial pour of quick setting cementitious material as shown in FIG. 5.

In order to achieve a good bond for the new foundation with the concrete floor 22, the aforedescribed recess 24 would be formed in the concrete floor, as previously described, around and between the remaining portion 45 of the previously existing foundation and the aforementioned vertical panels. FIG. 8 illustrates the hollow form 10 positioned around the remaining portion 45 of the previously existing foundation. If deemed necessary, additional rebar or reinforcing rods may be installed within the remaining old foundation and extend therefrom. Any surface contamination that might possibly remain from the previously existing foundation may be air blasted with a dry abrasive or water blasted, which processes also serve to clean the surface of the remaining portion 45.

Figure 11:
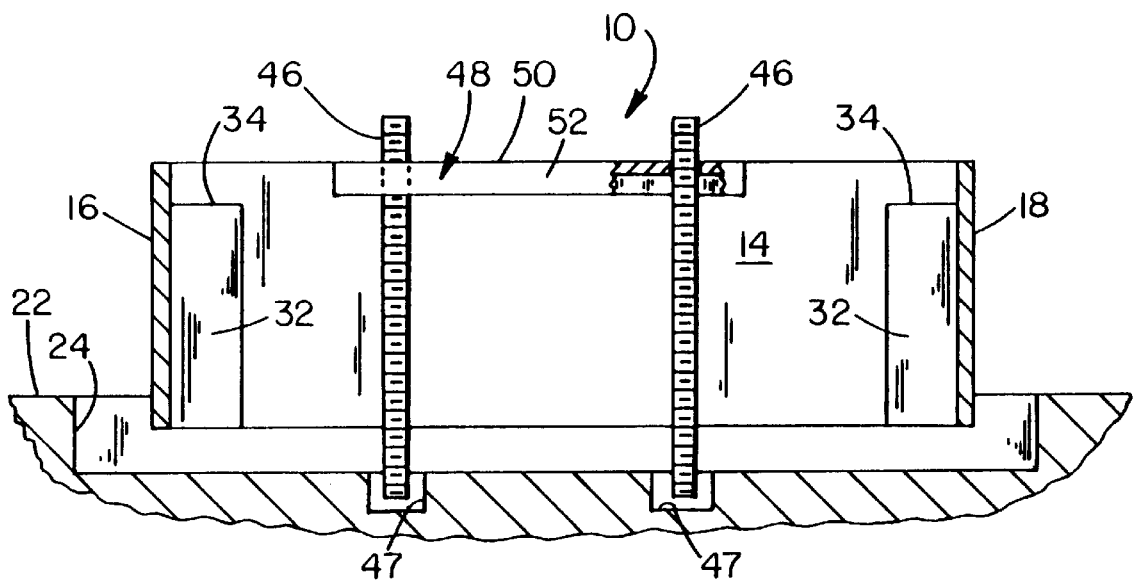
FIG. 11 is a front elevational view of the hollow form, as shown in FIG. 1, broken away and in cross-section, and illustrating one example of vertically extending support rods, the lower ends of which may be received within holes formed in the bottom of the recess, which is formed in the concrete floor, and which threaded rods also may extend through a base plate for later connection to a machine that will be positioned on the base plate, and the machine may or may not be connected to the threaded upper ends of the support rods.

To facilitate the later installation of a pump, machine, or equipment, vertically extending support rods 46 for such pump, machine, or equipment, may be used, the lower ends of which may be received within holes 47 formed in the bottom of the recess, which is formed in the concrete floor 22 within the hollow form 10, as shown in FIG. 11, before any pour is made. A suitable epoxy anchor grout (not shown) may be used to secure the lower ends of the support rods 46 within the holes 47. In this manner, the vertically extending support rods may later be surrounded and extend through the cementitious material within the hollow form and also through the grout of the corrosion resistant material of the resulting horizontal surface 42 of the corrosion resistant machine foundation 44. The vertically extending support rods 46, which are usually manufactured with threads provided along their entire length so that they may be cut to whatever length required, enable a pump, machine, or equipment to be quickly and suitably bolted securely to the new corrosion resistant machine foundation 44.

In some applications of this invention it may be considered desirable to provide a base plate 48, which may be made of some metal or other suitable material, through which the vertically extending support rods 46 may also extend and on which the pump, machine, or other equipment may be positioned before bolting. The upper flat surface 50 of the base plate may be exposed at the horizontal surface 42 of the corrosion resistant machine foundation, while the flange portion 52, which may or may not be provided on the base plate, would be embedded within the corrosion resistant polymer concrete grout 40, as shown in FIG. 11. In this manner, the aforementioned pump, machine, or equipment would be supported directly upon the upper flat surface 50 of the base plate 48.

Figure 12:
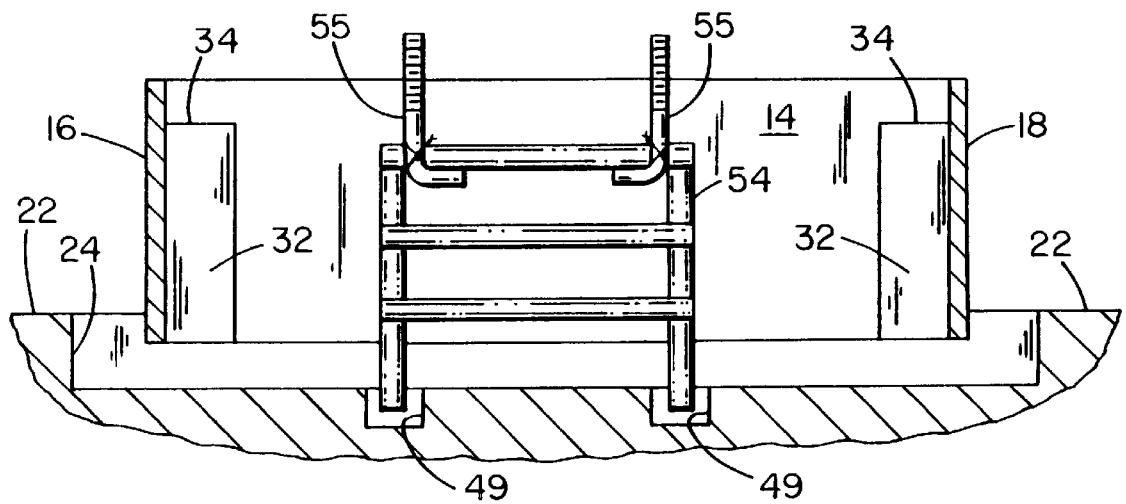
FIG. 12 is a front elevational view of the hollow form, as shown in FIG. 1, broken away and in cross-section, and illustrating one example of reinforcement rods, the lower ends of which may be received within holes formed in the bottom of the recess, which is formed in the concrete floor, and which reinforcement rods extend into the area to be filled with cementitious material, and also illustrating the possible use of J-bolts suitably secured to the reinforcement rods for later connection to a pump or machine.

Suitable metal reinforcement rods 54, as shown in FIG. 12, may also be used in a known and conventional manner to reinforce the corrosion resistant machine foundation 44. Such reinforcement rods may be used, the lower ends of which may be received in holes 49 formed in the bottom of the recess 24 formed in the concrete floor 22, as shown in FIG. 12, and extend into the area filled with cementitious material with the reinforcement rods later being surrounded and embedded by the cementitious material. A suitable epoxy anchor grout (not shown) may be used to secure the lower ends of the reinforcement rods 54 within the holes 49. Conventional threaded J-bolts 55 serving as tie-down bolts for later connection to a pump or machine, may be suitably connected to the reinforcement rods 54, as shown in FIG. 12.

Figure 9:
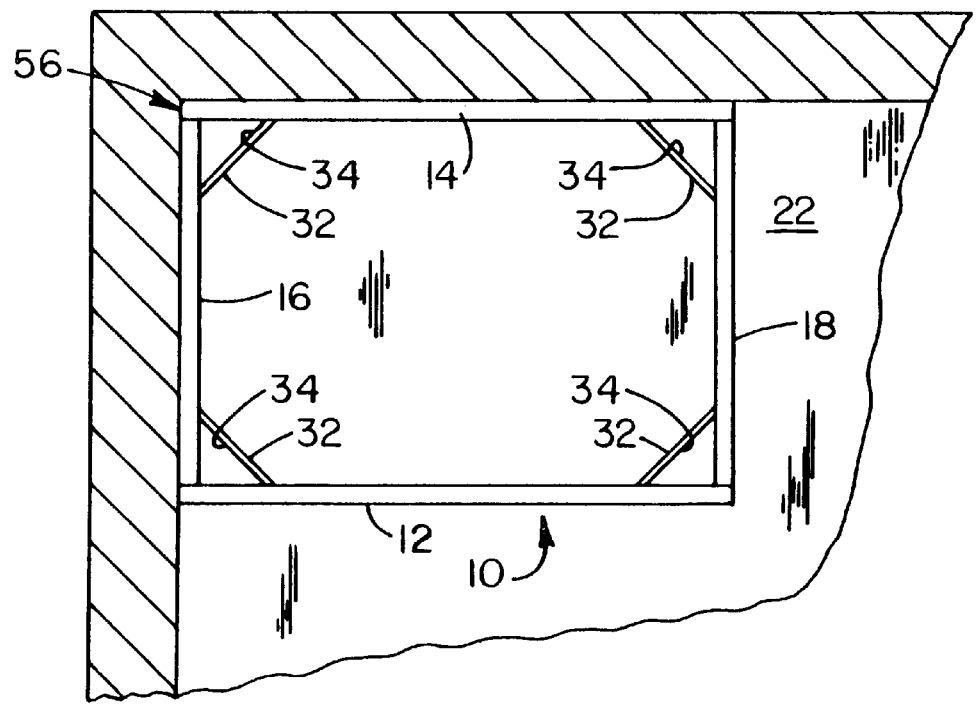
FIG. 9 is a plan view of a hollow form for a corrosion resistant machine foundation, as shown in FIG. 1, and illustrating how the hollow form may be positioned at an interior corner of a building.

In reference to FIG. 9, the hollow form 10 may not only be positioned somewhere in the middle of an industrial floor, but may also be positioned at an interior corner 56 of a building (not shown). Provision may readily be made for handling suitable bar clamps, as by suitably connecting in some manner to the concrete or block wall of the building at that location to secure at least one of the ends of each bar clamp required.

Figure 10:
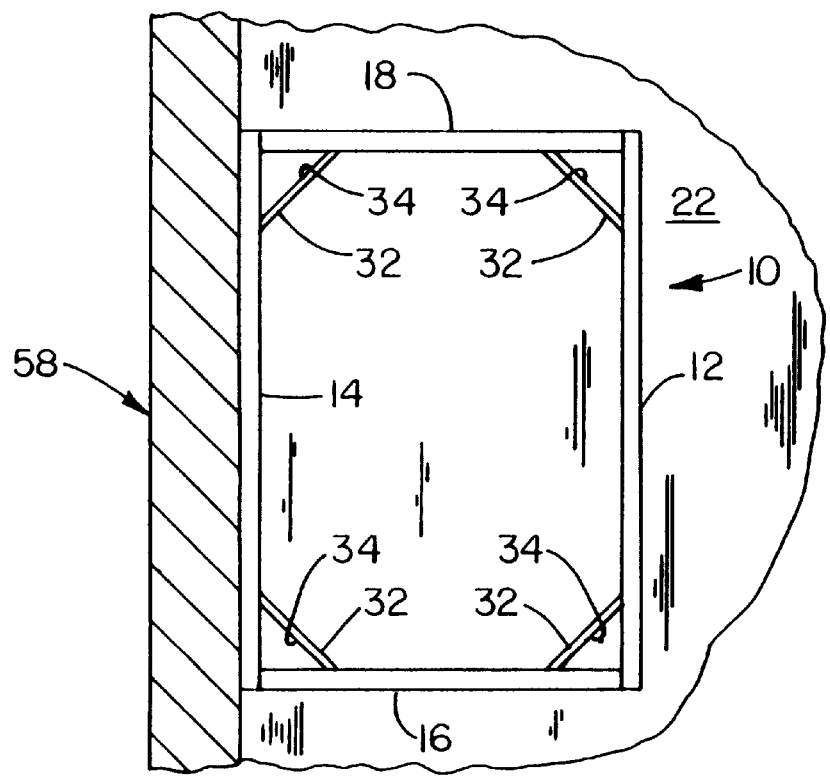
FIG. 10 is a plan view of a hollow form for a corrosion resistant machine foundation, as shown in FIG. 1, and illustrating how the hollow form may be positioned along an interior wall of a building.

In reference to FIG. 10, the hollow form 10 may be positioned along a wall 58 of a building.

Figure 13:
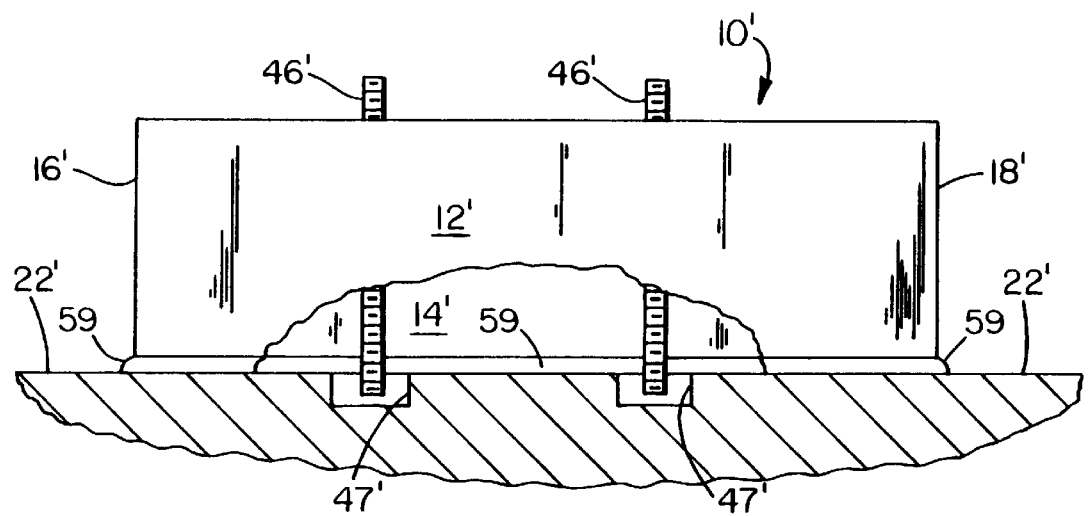
FIG. 13 is an elevational view of a hollow form for a corrosion resistant machine foundation that may be installed upon the surface of a concrete floor, partly broken away and in cross-section, and illustrating supporting rods, the lower ends of which may be received within holes formed in the concrete floor.

In reference to FIG. 13, the hollow form 10' for the corrosion resistant machine foundation may be installed directly upon the surface of the concrete floor 22', instead of being installed within the aforementioned recess 24 shown in the other figures of the drawings. When installed in the manner illustrated in FIG. 13, it would be preferable initially and before the first pour to apply a bead 59 of sealant, such as a suitable silicone, around the perimeter of the hollow form, and preferably applied interiorly as well as applied exteriorly, where the foundation comes into contact with the concrete floor 22', and also where the barrier intersects the vertical panels. After the corrosion resistant machine foundation has been completed, the bead 59 of silicone sealant that had been applied exteriorly would be replaced with a larger bead of corrosion resistant polymer concrete grout to assure a good seal of the foundation where it meets the concrete floor.

In reference again to FIG. 13, the aforementioned vertically extending support rods 46', the lower ends of which may be received within holes 47' formed within the concrete floor 22' for subsequent extension of the support rods through the aforementioned base plate 48', if one is required, for later connection to a machine that will be positioned upon the base plate and the machine may or may not be connected to the vertically extending threaded support rods 46'. Obviously, also, the corrosion resistant machine foundation may be constructed without using a base plate.

Figure 14:
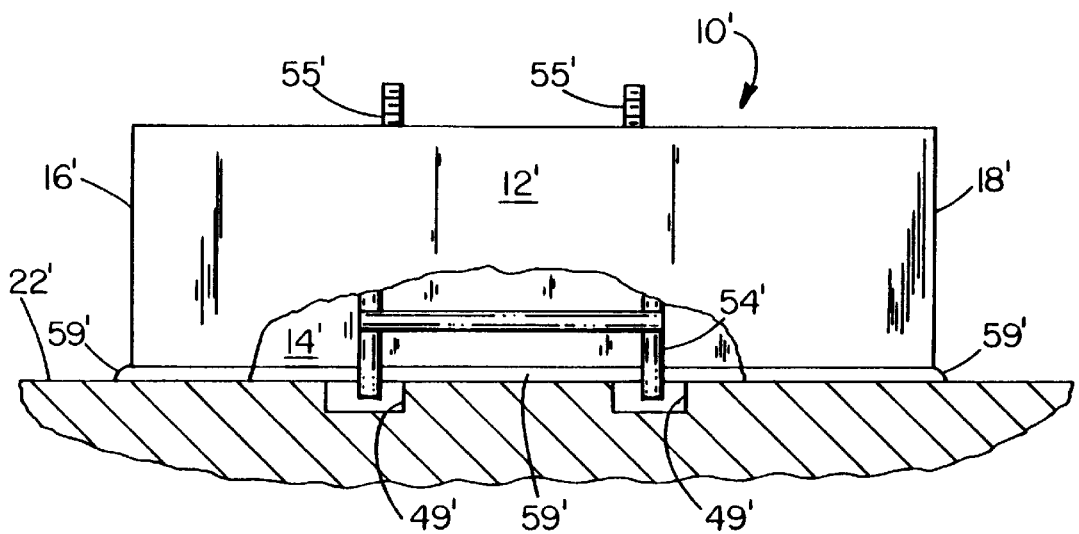
FIG. 14 is a fractional view of a hollow form showing how reinforcement rods, the lower ends of which may be received within holes formed in the concrete floor.

In reference to FIG. 14, if the hollow form 10' is installed directly upon the surface of the concrete floor 22', then the suitable metal reinforcement rods 54' would extend from holes 49' formed within the concrete floor so that the resulting foundation will be held more securely in place.

Figure 15:
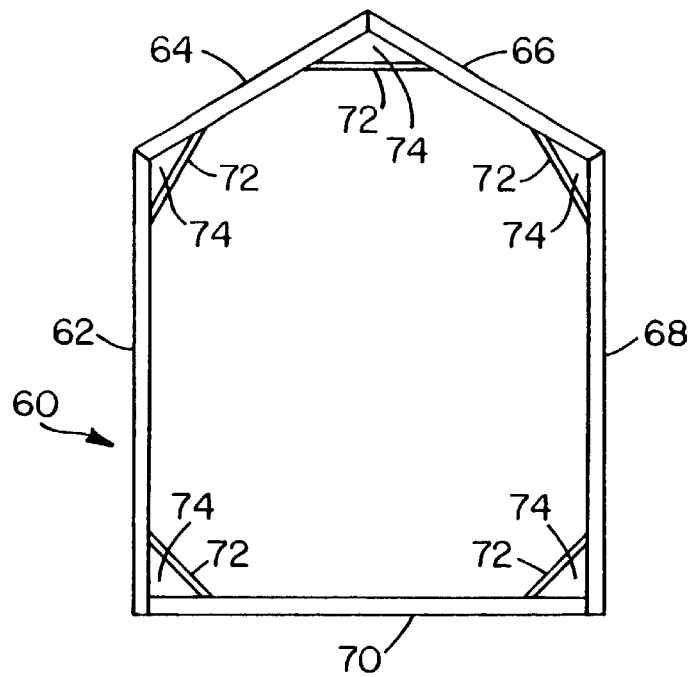
FIG. 15 is a plan view of an alternate construction of a hollow form for a corrosion resistant machine foundation.

In reference to FIG. 15, an alternate construction of a hollow form 60 having vertically extending panels 62, 64, 66, 68, and 70 is shown. A barrier 72 is formed across each interior corner of the hollow form 60 where one side edge of one vertical panel intersects with the side edge of an adjacent vertical panel. As will be observed, some of the interior corners form right angles while at least two interior corners, as formed by the intersection of vertical panels 62, 64, and of vertical panels 66, 68, each extend greater than 90 degrees or greater than a right angle. This embodiment only represents that the corrosion resistant machine foundation of the invention may assume various forms in the field, dependent upon the configuration of the pump, machine or equipment that is to be supported by the foundation. Vertical panels may be cut to size in the field at the job site to fit whatever may be required, without waiting for the structure to be custom manufactured at the manufacturing plant where the panels are initially formed. Obviously, if there were a number of similarly configured hollow forms required at a particular job site, suitable vertical panels for such configuration of hollow form could also be cut to size beforehand at the manufacturing plant, but only shipped as individual panels rather than constructing the hollow form beforehand, which would obviously otherwise require more shipping space to accommodate such prior constructed hollow forms.

Figure 16:
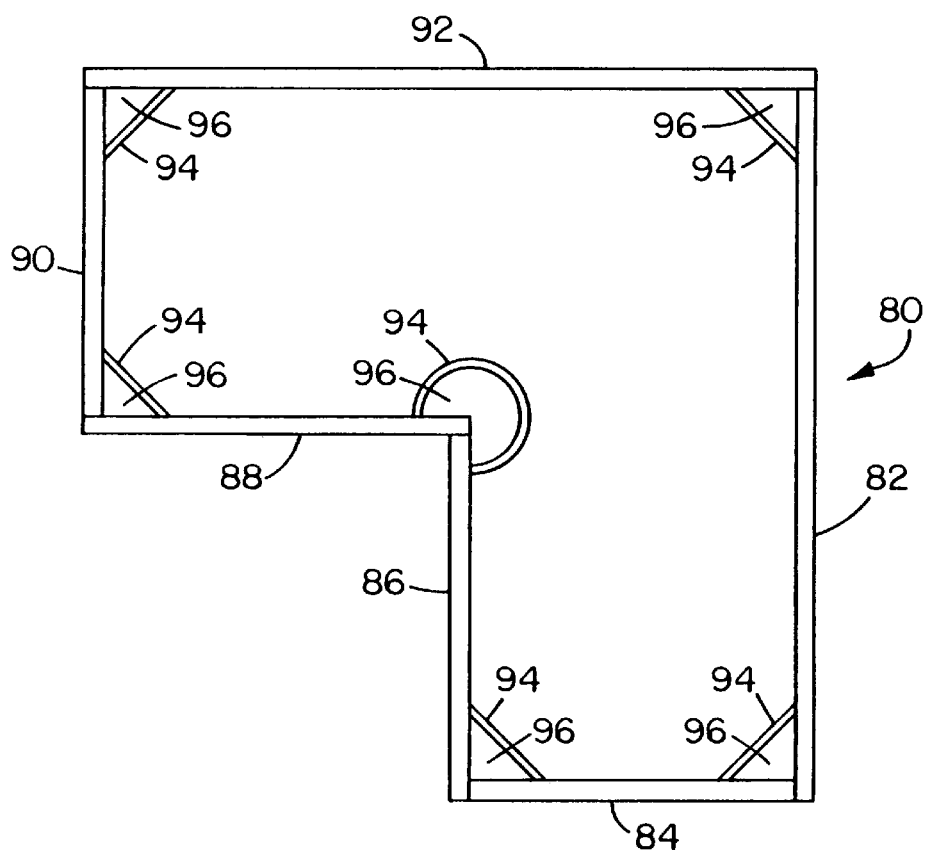
FIG. 16 is plan view of still another alternate construction of a hollow form for a corrosion resistant machine foundation, and also illustrating barriers, which may not only be formed across interior corners but also around an interior corner of the hollow form that is greater than 90 degrees.

In reference to FIG. 16, another alternate construction of a hollow form 80 is shown having vertically extending panels 82, 84, 86, 88, 90, and 92. A barrier 94 is formed across each interior corner of the hollow form 80 where one side edge of one vertical panel intersects with the side edge of an adjacent panel; and in the situation of the intersection of vertical panel 86 with vertical panel 88, the barrier 94 extends across or around the corner in the manner illustrated in the drawing.

The invention has been described in detail with particular reference to preferred embodiments thereof, but it will be understood that variations and modifications can be effected within the spirit and scope of the invention.

I claim:

1. A corrosion resistant machine foundation comprising:
   a) precast vertical panels of an aggregate filled thermosetting resin defining an enclosed hollow form, each of the two side edge portions of each vertical panel intersecting one of the two side edge portions of an adjacent vertical panel at a predetermined angle and forming therewith a corner of said enclosed hollow form;
   b) means within said hollow form defining at each said corner a barrier extending across and spaced from said corner from one vertical panel to an adjacent vertical panel and from the bottom of the hollow form to a predetermined height that is less than the height of the two adjacent vertical panels to form a vertically extending chamber;
   c) a portion of the bottom of the vertically extending chambers and said hollow form being filled with a cementitious material within the area of the hollow form between all of the vertical panels and each of the barriers to the top of each said barrier;
   d) each of said vertically extending chambers and the remaining area within said hollow form above said predetermined height of said barriers being filled to the top of all of said vertical panels with a grout of corrosion resistant material to define an essentially flat corrosion resistant horizontal surface for said corrosion resistant machine foundation to which a machine may be attached.

2. A corrosion resistant machine foundation as defined in claim 1, and wherein said corrosion resistant machine foundation is positioned on a concrete floor to which said cementitious material within said hollow form bonds said corrosion resistant machine foundation and said concrete floor together.

3. A corrosion resistant machine foundation as defined in claim 2, and wherein vertically extending support rods for said machine are secured to said concrete floor and extend through said cementitious material within said hollow form and also through said grout of corrosion resistant material of said horizontal surface for connection to said machine.

4. A corrosion resistant machine foundation as defined in claim 2, and wherein reinforcement rods extend vertically upwardly from said concrete floor into said area of the hollow form filled with said cementitious material, the reinforcement rods being surrounded and embedded by said cementitious material.

5. A corrosion resistant machine foundation as defined in claim 1, and wherein the bottom end portion of said corrosion resistant machine foundation is positioned within a recess formed in the concrete floor and is spaced slightly from the bottom of the recess, said cementitious material filled within said hollow form also filling said recess within and around said bottom end portion of said corrosion resistant machine foundation to bond said bottom end portion to said concrete floor.

6. A corrosion resistant machine foundation as defined in claim 5, and wherein vertically extending support rods for said machine are secured within the bottom of said recess and extend through said cementitious material within said hollow form and also through said grout of corrosion resistant material of said horizontal surface for connection to said machine.

7. A corrosion resistant machine foundation as defined in claim 5, and wherein reinforcement rods extend vertically upwardly from the bottom of said recess into said area of the hollow form filled with said cementitious material, the reinforcement rods being surrounded and embedded by said cementitious material.

8. A corrosion resistant machine foundation comprising precast vertical panels of an aggregate filled thermosetting resin defining an enclosed hollow form, each of the two side edge portions of a vertical panel intersecting one of the two side edge portions of an adjacent vertical panel at a predetermined angle and forming therewith a corner of said enclosed hollow form;

said machine foundation having a grout of corrosion resistant material:
  a) within a first area extending across and spaced from each corner from one vertical panel to an adjacent vertical panel and from the bottom of the machine foundation to a predetermined height that is less than the height of the two adjacent vertical panels; and
  b) within a second area extending from said predetermined height and across the width and length of the machine foundation to the top of the vertical panels to define an essentially flat corrosion resistant horizontal surface to which a machine may be attached;

and said machine foundation further having cementitious material within a third area extending between said first area and said second area.

9. A corrosion resistant machine foundation as defined in claim 8, and wherein said corrosion resistant machine foundation is positioned on a concrete floor to which said cementitious material within said third area bonds said corrosion resistant machine foundation and said concrete floor together.

10. A corrosion resistant machine foundation as defined in claim 9, and wherein vertically extending support rods for said machine are secured to said concrete floor and extend through said cementitious material within said third area and also through said grout of corrosion resistant material of said second area for connection to said machine.

11. A corrosion resistant machine foundation as defined in claim 9, and wherein reinforcement rods extend vertically upwardly from said concrete floor into said third area of the hollow form filled with said cementitious material, the reinforcement rods being surrounded and embedded by said cementitious material.

12. A corrosion resistant machine foundation as defined in claim 8, and wherein the bottom end portion of said corrosion resistant machine foundation is positioned within a recess formed in the concrete floor and is spaced slightly from the bottom of the recess, said cementitious material filled within said third area also filling said recess within and around said bottom end portion of said corrosion resistant machine foundation to bond said bottom end portion to said concrete floor.

13. A corrosion resistant machine foundation as defined in claim 12, and wherein vertically extending support rods for said machine are secured within the bottom of said recess and extend through said cementitious material within said third area and also through said grout of corrosion resistant material of said second area for connection to said machine.

14. A corrosion resistant machine foundation as defined in claim 12, and wherein reinforcement rods extend vertically upwardly from the bottom of said recess into said third area of the hollow form filled with said cementitious material, the reinforcement rods being surrounded and embedded by said cementitious material.

* * * * *